ROBERT L. BUTTON
INVENTOR.

BY

Townsend and Townsend

July 2, 1968
R. L. BUTTON
3,390,768
TOMATO HARVESTING APPARATUS
Filed Feb. 19, 1965
3 Sheets-Sheet 2
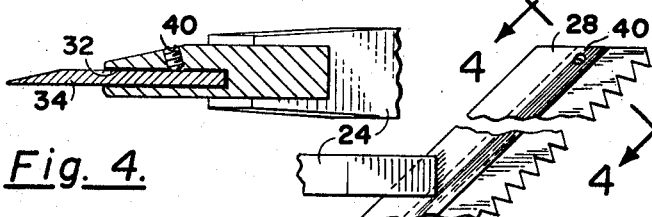
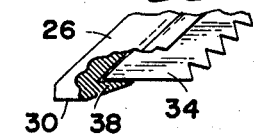
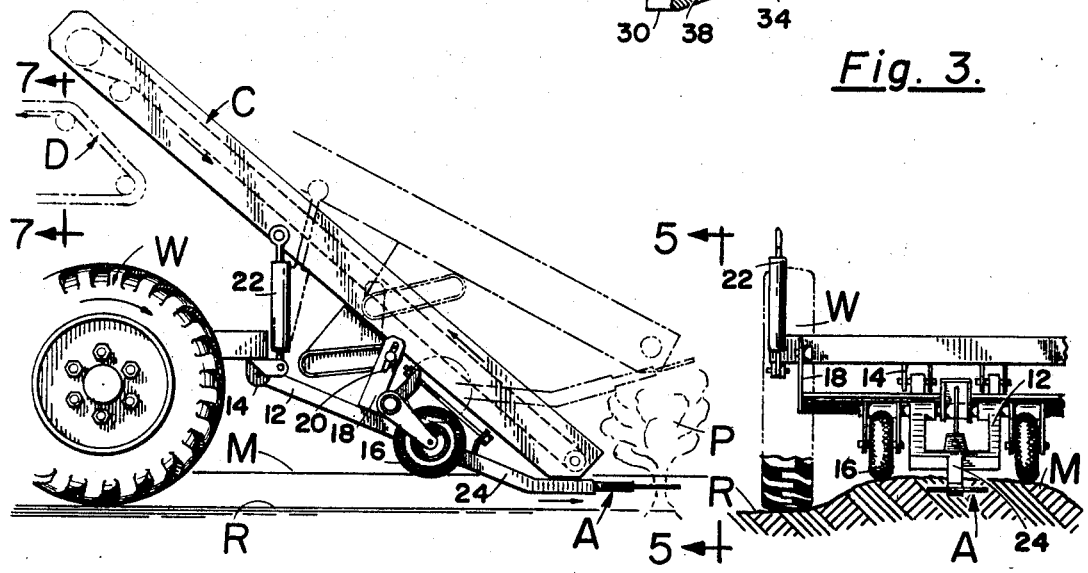
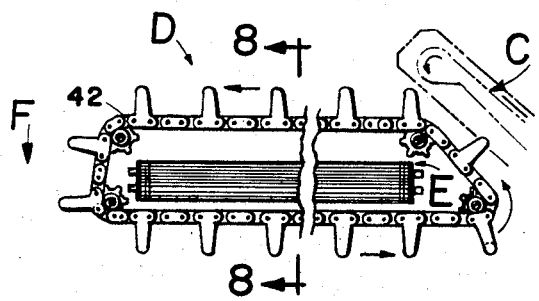
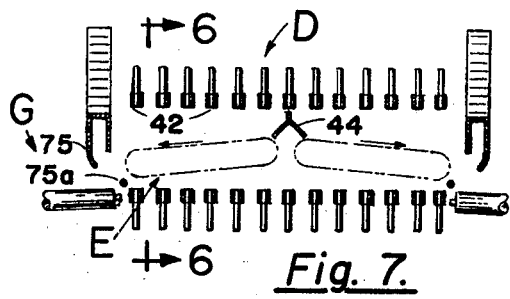
ROBERT L. BUTTON
INVENTOR.
BY
Townsend & Townsend

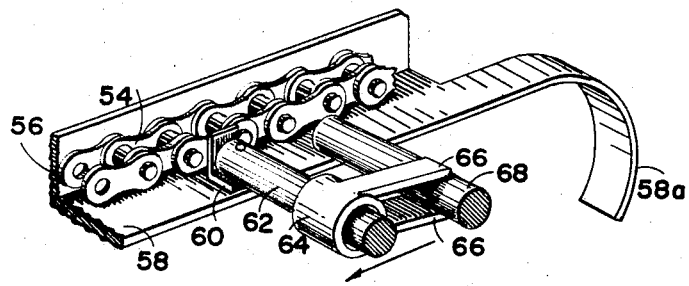
Fig. 9.
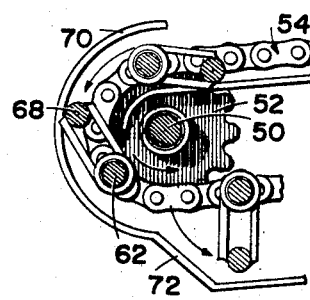
Fig. 8.
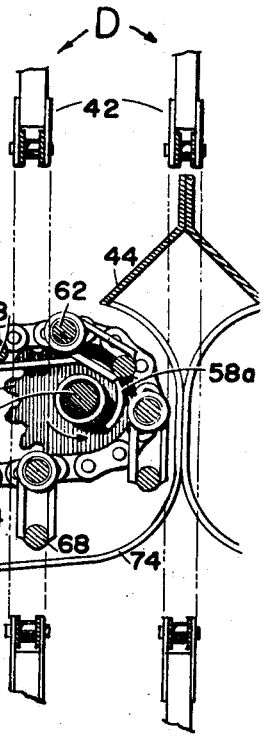
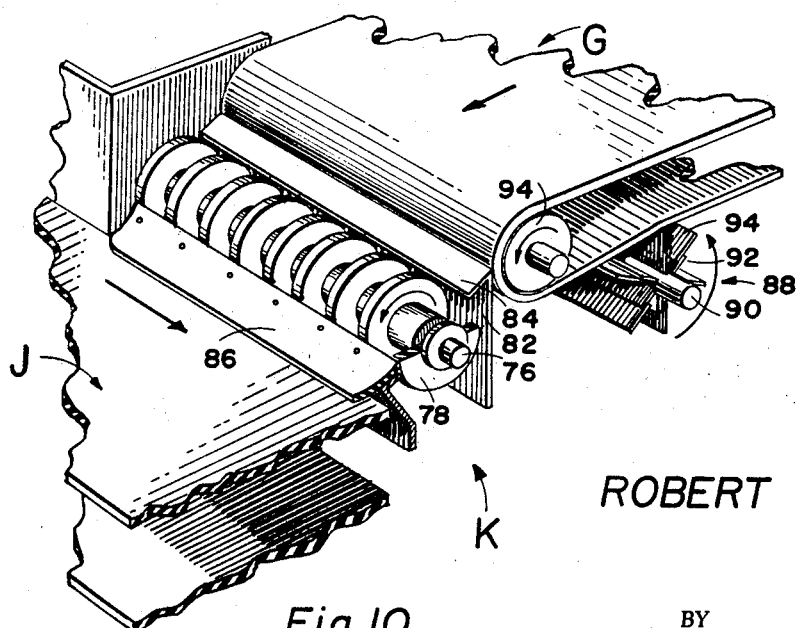
Fig. 10.
ROBERT L. BUTTON
INVENTOR.
BY
Townsend and Townsend United States Patent Office 3,390,768
Patented July 2, 1968

3,390,768
TOMATO HARVESTING APPARATUS
Robert L. Button, Rte. 1, Box 205,
Winters, Calif. 95694
Filed Feb. 19, 1965, Ser. No. 434,002
1 Claim. (Cl. 209—84)

ABSTRACT OF THE DISCLOSURE

A tomato harvesting device suitable for use in severing tomato plants intermingled with refuse and grown in earthen mounds bound on each side by furrows, including in combination a base mounted on wheels, a carriage pivotally mounted to the base and supporting a knife blade for severing tomato plant stems, means for transporting the severed plants onto the base, means on the base for shaking the severed plants to separate tomatoes therefrom, at least one endless bar conveyor disposed below the shaking means to receive the tomatoes and transport them to conveyors where further separation is accomplished through the use of a shaft carrying a plurality of spaced resilient discs over which the desired tomatoes will be transported.

This invention relates to tomato harvesting apparatus of the type that is propelled over a tomato field to sever tomato bearing plants from the earth and separate the tomatoes from the severed plants.

The present invention concerns a machine of the type disclosed in my co-pending application Ser. No. 160,089, filed Dec. 18, 1961, now Patent No. 3,193,020, issued July 6, 1965. Generally speaking, such a machine includes a self-propelled vehicle that is moved over a tomato field and that severs the entire tomato plant from the field, transports the tomato plant on conveyors which shake the tomato bearing plant to remove the tomatoes therefrom, conveys the tomatoes past an inspection station at which human operators manually remove culls, separates refuse such as dirt, stones, etc. from the tomatoes, and discharges the cleaned, sorted tomatoes at an outlet station.

An object of this invention is to provide tomato harvesting apparatus that cleans and separates more thoroughly the unwanted dirt and refuse from the tomatoes.

Another, and more specific, object is to provide an improved severing blade structure for severing the tomato plants from the earth at the inlet or front end of the machine. Attainment of such an object takes the form of a slotted structure mounted at the forward end of the machine which structure defines a slot adapted to removably receive therein a thin serrated cutting blade. The serrations in the blade enhance the cutting capabilities; the ability to remove the blade expedites the sharpening and/or replacement of the blade.

Still another object is to provide an improved conveyor upon which separated tomatoes and small refuse are discharged and which conveyor is particularly effective in removing most, if not all, such refuse while transporting the tomatoes within the harvester. In achieving this object a conveyor is provided that has spaces in the conveying reach through which unwanted refuse falls; the conveyor is so constructed that on the return reach thereof the spaces are enlarged to permit discharge of all refuse therefrom.

Still another object is to provide a pivotally mounted blade supporting structure or boom for supporting the serrated blade in a fixed relation to the surface of the field in which the tomato plants are growing. Such object is achieved by providing closely spaced gauge wheels on the structure that supports the cutting blade, to the end that irregularities in the surface of the ground adjacent the plant will be detected, and the cutting blade will sever the plants at uniform heights.

A further object is to provide a machine of the type here under consideration that has a tomato conveyor belt with which is associated a cleaning device for the belt that maintains the belt in a dirt-free condition, and yet does not interfere with the transportation of tomatoes in the apparatus. Achievement of this object is important because fields on which tomato plants are grown are frequently muddy and mud is picked up with the tomato plant.

These and other objects will be more apparent after referring to the following specification and accompanying drawings in which:

FIG. 2 is a side elevation view of the forward portion of the harvester of FIG. 1;

FIG. 3 is an enlarged detail view of the plant serving structure of the present invention;

FIG. 4 is a cross-section view taken along line 4—4 of FIG. 3;

FIG. 5 is a front view of the lower portion of the harvester of FIG. 1;

FIG. 6 is a partially schematical longitudinal cross sectional view of a conveyor of the present invention taken substantially on the plane indicated by line 6—6 of FIG. 1;

FIG. 7 is a partially schematic transverse cross-sectional view of the conveyor of FIG. 6;

FIG. 8 is an enlarged transverse cross-sectional view of the schematically shown conveyor of FIG. 7;

FIG. 9 is a perspective view at enlarged scale of a detail of the conveyor of FIG. 8; and FIG. 10 is a perspective view of a conveyor-transfer apparatus mounted at the rear portion of the harvester of FIG. 1.

Figure 1:
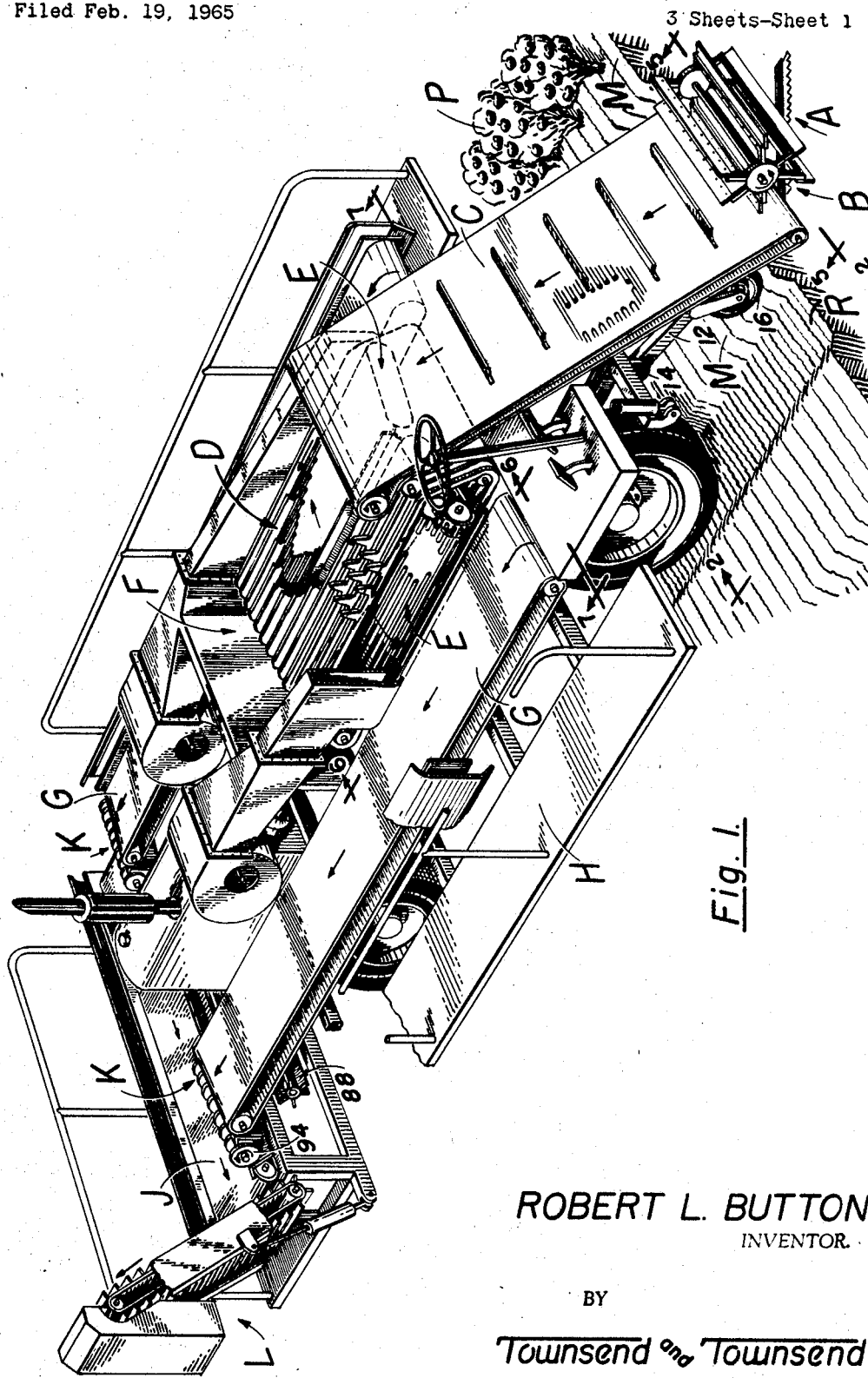
FIG. 1 is a perspective view of a tomato harvester constructed in accordance with the present invention.

The harvester schematically depicted in FIG. 1 is particularly useful for harvesting tomatoes growing on tomato plants P in raised mounds M in a tomato field. Furrows R are typically provided on each side of the mound.

The harvester of the present invention includes main wheels W which support the machine and ride in furrows R. Carried at the forward extremity of the machine is a blade assembly A for severing the plants just beneath the surface of mound M. A reel B is provided for directing severed plants onto a conveyor C that carries the plants upwardly and rearwardly of the harvester. At the top rear end or discharge end of conveyor C the plants are discharged onto an endless chain conveyor D. Chain conveyor D is driven in compound motion with a net forward movement on which is superimposed a periodically reversing movement for shaking the plants to free the tomatoes. A drive mechanism suitable for driving chain conveyor D is described in co-pending patent application Ser. No. 426,894, filed Jan. 21, 1965, now U.S. Patent No. 3,364,770, issued Jan. 23, 1968. The tomatoes drop through the spaces between the individual chains of conveyor D onto one or the other of a pair of transverse bar conveyors E. The plant stalks are discharged into an opening F at the outlet end of conveyor D for disposal. As will be explained in more detail hereinafter, bar conveyor E effects a further separation of stalks, refuse and the like, from tomatoes conveyed thereon. Tomatoes are discharged from bar conveyor E onto an endless belt conveyor G that moves the tomatoes rearwardly of the machine. When tomatoes fall from the discharge end of bar conveyor E they pass through an air blast of high velocity. This air blast removes fine dirt, broken vines, dried tomatoes, leaves, etc. before the tomatoes reach the sorting belt or conveyor G. This removal of debris at this point prior to the hand sorters is of great benefit. The debris is carried by the air blast onto the ground under said machine. The air blast is directed between the top of conveyor G and the bottom of bar conveyor E. Therefore it is readily seen that it blows opposite the direction on the flow of fruit falling from bar conveyor E. Such air blast system is more fully described in my aforecited Patent No. 3,193,020, supra. Platforms H are provided for supporting human operators adjacent conveyor G to enable the operators manually to remove culls from the tomatoes. At the rearward extremity of conveyor G tomatoes are discharged onto the transversely moving conveyor J. Intermediate conveyor G and J is a cleaning and separating mechanism K which separates any residual undersized tomatoes or unwanted refuse and dirt. Tomatoes moving transversely on conveyor J are discharged into an outlet station L from which the tomatoes are taken for further processing and packing.

The structure for mounting severing blade A includes a boom frame 12 pivotally mounted at 14 to the main frame of the harvester. Gauge wheels 16 are mounted on the boom frame and are spaced sufficiently close to one another that the wheels bear on mound M. Extending upwardly from boom frame 12 are arms 18 for supporting the forward end of conveyor C in fixed relation to the boom frame. Arms 18 each include an elongate slot 20 for affording adjustment of the space between the conveyor and the boom frame. A hydraulic actuator 22 is mounted between the main frame and conveyor C to raise the conveyor and boom to clear obstructions and to permit over-the-road transport of the apparatus.

Rigidly extending forwardly of boom frame 12 is a boom 24, to the forward extremity of which is rigidly secured a blade supporting structure 26. The blade supporting structure is mounted on the boom obliquely of the direction of movement of the apparatus. Accordingly, the blade supporting structure has a leading end 28 and a trailing end 30. The structure defines a forwardly opening slot 32 for receiving therein a blade 34 having serrations or teeth 36 along the forward edge thereof. Slot 32 terminates inwardly of trailing end 30 to define a bearing surface 38 for supporting the blade against rearward and transverse movement. The presence of bearing surface 38, as well as the rear face of slot 32, affords such firm support to blade 34 that only one small set screw 40 is needed to retain the blade in the slot. Blade removal is consequently extremely simple.

The angular orientation of blade 34 in cooperation with serrations 36 materially improve the plant severing ability of the apparatus. Easy removal of the blade encourages frequent sharpening of the blade.

In a manner more fully described in the above mentioned patent, severed tomato plants are directed onto conveyor C by reel B and are deposited by conveyor C onto shaking conveyor D. Individual chains 42 of the shaker conveyor are laterally spaced apart (FIG. 8) by an amount sufficient to permit downward egress of the tomatoes as they are separated from the plants. Transversely centered beneath shaker conveyor D is an inverted generally V-shaped baffle 44 for distributing such tomatoes to one or the other of transverse bar conveyors E. Because the transverse bar conveyors are substantially identical, only one will be described in detail in connection with FIGS. 8 and 9. Laterally spaced from the longitudinal center-line of the apparatus and extending parallel thereto is a first shaft 46 rotatively supported and driven through any suitable conventional power train (not shown). Reference character 48 indicates one of a pair of identical sprockets secured to shaft 46 for rotation therewith. Outwardly of shaft 46 and extending parallel thereto at a slightly lower level is an idler shaft 50 on which are mounted a pair of sprockets 52 in alignment with respective driven sprockets 48 so that a chain 54 is mountable between each pair of sprockets. Sprocket 48 is driven in such direction that the upper reach of chain 54 moves transversely outwardly. An angle iron 56 is securely mounted in the frame of the machine and defines a horizontal bearing surface 58 for supporting each chain 54 throughout the upper reach thereof. Mounted to links of chain 54 for projection inwardly of the conveyor are a plurality of spaced apart angle clips 60 which serve to mount to chain 54 in driven relation thereto a plurality of conveyor bars 62. Bars 62 are spaced from one another by an amount somewhat greater than twice the diameter of the tomatoes.

At least two sleeves 164 are mounted on each bar 62 in loosely circumscribing relation thereto. Secured to each sleeve 64 is a pair of straps 66 between the opposite extremities of which is welded or otherwise suitably affixed a follower bar 68. Each follower bar 68 spans conveyor E and slidably bears on bearing surface 58. Straps 66 are of a length that follower bar 68 is midway between two adjacent conveyor bars 62. The distance between conveyor bar 62 and follower bar 68 is also chosen in relation to the diameter of the tomatoes and is less than such diameter. Accordingly, it will be seen that during traverse of top reach of conveyor E conveyor rods 62 will be drawn along by chains 54, and through sleeve 64 and straps 66, follower bars 68 will be drawn along with chain movement. Bars 68 are maintained in approximate alignment with the upper reach of chain 54 by horizontal surface 58 so that a slotted tomato transporting surface is defined by the upper reach. That is to say, the top reach forms a conveyor constituted by bars 62 and 68 and which conveyor has spaces between adjacent bars for the downward egress of refuse such as mud, stones, roots, stalks, leaves and the like. Since the space between adjacent bars 62 and 68 is less than the diameter of the tomatoes, the tomatoes will be supported and transported by conveyor E. Such tomatoes are discharged onto conveyor G where they are visually inspected in their progress rearwardly of the machine.

Adjacent to the outlet end of conveyor E and on each side thereof in a common vertical plane with surface 58 is a restraining band having an arcuate portion 70 for constraining follower bars 68 to an arcuate path and against the force of gravity and centrifugal force. Below shaft 50 the arcuate portion of the band terminates into a downward sloping portion 72; upon passage of follower bars 68 past the discontinuity between arcuate portion 70 and downwardly sloping portion 72, the follower bars pivot by virtue of the loose fit of sleeve 64 around bars 62 thus opening up the bottom reach of the conveyor. During the entire traverse of the bottom reach, the space between adjacent bars 62 permit discharge of any debris tending to accumulate on the lower reach. The restraining band curves upwardly as at 74 adjacent the center of the machine so as to guide follower bars 68 into following relationship with respect to conveyor bars 62. This portion of the restraining band assists gravity in this respect. Bearing surface 58 commences as at 58a below the center line of shaft 46 to support the ends of follower bars 68 and guide the same in a straight path along the upper reach of the conveyor.

The aforedescribed structure for conveyor E has been found effective for separating virtually all unwanted refuse that is deposited with the tomatoes from shaker conveyor D. Accordingly, tomatoes that are discharged onto conveyor G are clearly visible to the operators standing on platform H.

Material passing from bar conveyor E onto conveyor G is subjected to an air blast emanating from an air duct 75 in a manner described in my Patent No. 3,193,020 to effect further separation of unwanted debris. A rod 75a prevents expulsion of the tomatoes with the debris.

Although most culls and undersized dirt clods are removed from conveyor G by the operators standing adjacent thereto, it is inevitable that some culls and undersized clods are overlooked. At the rear output end of conveyor G there is provided transferring sorting apparatus for eliminating all undersized clods and green undersized fruit. Included in the structure is a shaft 76 suitably journaled in the frame of the machine and driven through a drive train of conventional construction and therefore not shown. Secured to shaft 76 for rotation therewith is a plurality of spaced apart discs 78 of resilient material such as rubberized fabric or the like. Hubs 80 are sized to space adjacent discs 78 from one another by an amount slightly less than the minimum size acceptable tomatoes to the end that undersized green tomatoes and clods will drop between adjacent discs and not discharge onto the transverse conveyor J. For guiding the tomatoes over discs 78 a flange 82 is provided in association with the outlet end of conveyor G. The flange includes a lip 84 overhanging a portion of the discs. A discharge plate 86 is mounted opposite lip 84 for guiding proper sized tomatoes onto conveyor J. Thus it will be seen that proper sized tomatoes are conveyed without injury, the discs being resilient, and that undersized green tomatoes and clods drop through the space delimited by confronting side faces of discs 78, shaft 76 and discharge plate 86. Any small bits of refuse still remaining with the tomatoes are separated at separator structure K.

Conveyor G during operation becomes soiled from mud and the like clinging thereto. On the return reach of the conveyor there is provided a surface scraper and cleaner 88 for scraping mud and the like from the surface of the conveyor. The scraper, being disposed on the return reach, in no way interferes with the transport of tomatoes on the conveyor. The scraper includes a driven shaft 90 journaled in the frame of the apparatus and driven through a conventional drive train (not shown). Extending radially from shaft 90 is a plurality of brackets 92 for mounting resilient, e.g. rubberized, blades 94 for rotation with shaft 90. The shaft is driven in a direction such that blades impinging on the surface of conveyor G move in a direction opposite from the direction of movement of the lower conveyor reach. Accordingly, scraping action occurs. Scraping structure 88 is disposed in a span of the return reach, that is to say, remote from conveyor supporting rollers, such as roller 94. Therefore, as blades 94 successively move into and out of contact with the conveyor, a component of vertical periodic motion is imparted to the conveyor as a result of which the conveyor at the return reach flexes slightly. Such action enhances the effectiveness of scraper apparatus 88.

Thus it will be seen that the present invention provides an improved apparatus for efficiently cutting tomato plants from a field, separating the tomatoes from the plants, presenting the separated tomatoes for visual inspection, and cleaning the tomatoes and separating refuse therefrom. All of these steps are carried out in such a way as to avoid abrasion or bruising of the fruit to the end that a superior product both in terms of cleanliness and general quality is obtained by use of the present invention. The last-mentioned advantages are obtained without any complex or fragile mechanism to the end that a long wearing, maintenance-free machine is provided.

Although one embodiment of the present invention is shown and described it will be obvious that other adaptations and modifications can be made without departing from the true spirit and scope of the invention.

What is claimed is:

1. Apparatus for transporting along a path articles intermingled with refuse and for separating the refuse comprising a pair of endless drive members, means for supporting said endless members with an upper reach of each member in said path and laterally spaced from one another, the return reach of each endless member extending below the path, said upper reach and lower reach defining therebetween a continuous refuse-pervious region so that said lower reach is in refuse-receiving relation to said upper reach, a first plurality of bars spanning said endless members and mounted on opposite ends thereof to respective said members, said first plurality of bars being spaced uniformly around said endless members, a second plurality of bars spanning the path, means for mounting each of said second plurality of bars in following relation to one of the bars in said first plurality, adjacent of said first and second bars defining a space sufficient for retaining said articles on said path throughout traverse of said upper reach, last said mounting means being adapted to support bars of said second plurality for pivotal movement about the bar of said first plurality forward thereof and between two adjacent bars of said first plurality, means defining a bearing surface supporting the bars of said second plurality substantially coplanarly with the bars of said first plurality throughout traverse of the upper reach, said upper and return reach defining a vertical space therebetween to provide unencumbered gravitational egrees of at least some of said refuse from said upper reach to said return reach, said bearing surface terminating to permit the bars of said second plurality to pivot downwardly during traverse of the return reach to allow for substantially complete release of said refuse through said return reach.

References Cited

UNITED STATES PATENTS

| | | | |
|---|---|---|---|
| 766,013 | 7/1904 | Baldwin | 198—230 |
| 1,330,967 | 2/1920 | Winters | 198—230 |
| 1,337,257 | 4/1920 | O'Quinn | 209—84 |
| 1,829,934 | 11/1931 | Imus | 56—229 |
| 2,297,294 | 9/1942 | Flintzer | 171—140 X |
| 2,726,662 | 12/1955 | Komuchar et al. | 130—30 |
| 2,786,573 | 3/1955 | Lagarde | 209—104 |
| 3,199,604 | 8/1965 | Lorenzen et al. | 171—27 |

ANTONIO F. GUIDE, *Primary Examiner.*